US012155563B2

(12) United States Patent
Friedman et al.

(10) Patent No.: US 12,155,563 B2
(45) Date of Patent: Nov. 26, 2024

(54) FLEXIBLE PER-FLOW MULTIPATH MANAGED BY SENDER-SIDE NETWORK ADAPTER

(71) Applicant: MELLANOX TECHNOLOGIES, LTD., Yokneam (IL)

(72) Inventors: Yamin Friedman, Jerusalem (IL); Omer Shabtai, Tel Aviv (IL); Rotem Levinson, Haifa (IL); Idan Burstein, Akko (IL); Yuval Shpigelman, Netanya (IL); Charlie Mbariky, Shfar'am (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 101 days.

(21) Appl. No.: 17/902,920

(22) Filed: Sep. 5, 2022

(65) Prior Publication Data
US 2024/0080266 A1   Mar. 7, 2024

(51) Int. Cl.
  *H04L 45/00* (2022.01)
  *H04L 45/24* (2022.01)
(52) U.S. Cl.
  CPC .............. *H04L 45/38* (2013.01); *H04L 45/24* (2013.01); *H04L 45/566* (2013.01)
(58) Field of Classification Search
  CPC ........ H04L 45/38; H04L 45/24; H04L 45/566
  USPC ...................................................... 709/238
  See application file for complete search history.

(56) References Cited

U.S. PATENT DOCUMENTS

| | | | |
|---|---|---|---|
| 4,312,064 A | 1/1982 | Bench et al. | |
| 6,115,385 A | 9/2000 | Vig | |
| 6,169,741 B1 | 1/2001 | Lemaire et al. | |
| 6,480,500 B1 | 11/2002 | Erimli et al. | |
| 6,532,211 B1 | 3/2003 | Rathonyi et al. | |
| 6,553,028 B1 | 4/2003 | Tang et al. | |

(Continued)

FOREIGN PATENT DOCUMENTS

| CN | 1394053 A | 1/2003 |
|---|---|---|
| CN | 105141512 A | 12/2015 |

(Continued)

OTHER PUBLICATIONS

U.S. Appl. No. 17/353,869 Office Action dated Jan. 12, 2023.
(Continued)

*Primary Examiner* — Lan Dai T Truong
(74) *Attorney, Agent, or Firm* — MEITAR PATENTS LTD.

(57) ABSTRACT

A network adapter includes a port and one or more circuits. The port communicates packets over a network in which switches forward packets in accordance with tuples of the packets. The one or more circuits are to hold a user-programmable scheme specifying assignments of the packets of a given flow destined to a peer node to sub-flows having respective different tuples, assign first packets of the given flow to one or more of the sub-flows in accordance with the user-programmable scheme, by setting respective tuples of the first packets, transmit the first packets to the peer node via the port, monitor notifications received from the network, the notifications being indicative of respective states of the sub-flows, based on the notifications and on the user-programmable scheme determine an assignment of second packets of the given flow to the sub-flows, and transmit the second packets to the peer node via the port.

28 Claims, 6 Drawing Sheets

(56) References Cited

U.S. PATENT DOCUMENTS

| | | |
|---|---|---|
| 6,614,758 B2 | 9/2003 | Wong |
| 6,665,297 B1 | 12/2003 | Harigochi et al. |
| 6,775,268 B1 | 8/2004 | Wang et al. |
| 6,795,886 B1 | 9/2004 | Nguyen |
| 6,804,532 B1 | 10/2004 | Moon et al. |
| 6,807,175 B1 | 10/2004 | Jennings et al. |
| 6,831,918 B1 | 12/2004 | Kavak |
| 6,912,589 B1 | 6/2005 | Jain et al. |
| 6,912,604 B1 | 6/2005 | Tzeng et al. |
| 6,950,428 B1 | 9/2005 | Horst et al. |
| 7,010,607 B1 | 3/2006 | Bunton |
| 7,076,569 B1 | 7/2006 | Bailey et al. |
| 7,221,676 B2 | 5/2007 | Green et al. |
| 7,234,001 B2 | 6/2007 | Simpson et al. |
| 7,274,869 B1 | 9/2007 | Pan et al. |
| 7,286,535 B2 | 10/2007 | Ishikawa et al. |
| 7,401,157 B2 | 7/2008 | Costantino et al. |
| 7,590,110 B2 | 9/2009 | Beshai et al. |
| 7,676,597 B2 | 3/2010 | Kagan et al. |
| 7,746,854 B2 | 6/2010 | Ambe et al. |
| 7,899,930 B1 | 3/2011 | Turner et al. |
| 7,924,837 B1 | 4/2011 | Shabtay et al. |
| 7,936,770 B1 | 5/2011 | Frattura et al. |
| 7,969,980 B1 | 6/2011 | Florit et al. |
| 8,094,569 B2 | 1/2012 | Gunukula et al. |
| 8,175,094 B2 | 5/2012 | Bauchot et al. |
| 8,195,989 B1 | 6/2012 | Lu et al. |
| 8,213,315 B2 | 7/2012 | Crupnicoff et al. |
| 8,401,012 B2 | 3/2013 | Underwood et al. |
| 8,489,718 B1 | 7/2013 | Brar et al. |
| 8,495,194 B1 | 7/2013 | Brar et al. |
| 8,570,865 B2 | 10/2013 | Goldenberg et al. |
| 8,576,715 B2 | 11/2013 | Bloch et al. |
| 8,605,575 B2 | 12/2013 | Gunukula et al. |
| 8,621,111 B2 | 12/2013 | Marr et al. |
| 8,625,427 B1 | 1/2014 | Terry et al. |
| 8,681,641 B1 | 3/2014 | Sajassi et al. |
| 8,737,269 B1 | 5/2014 | Zhou et al. |
| 8,755,389 B1 | 6/2014 | Poutievski et al. |
| 8,774,063 B2 | 7/2014 | Beecroft |
| 8,867,356 B2 | 10/2014 | Bloch et al. |
| 8,873,567 B1 | 10/2014 | Mandal et al. |
| 8,908,510 B2 | 12/2014 | Sela et al. |
| 8,908,704 B2 | 12/2014 | Koren et al. |
| 9,014,006 B2 | 4/2015 | Haramaty et al. |
| 9,042,234 B1 | 5/2015 | Liljenstolpe et al. |
| 9,137,143 B2 | 9/2015 | Parker et al. |
| 9,231,888 B2 | 1/2016 | Bogdanski et al. |
| 9,264,382 B2 | 2/2016 | Bogdanski et al. |
| 9,385,949 B2 | 7/2016 | Vershkov et al. |
| 9,544,185 B1 | 1/2017 | Yadav et al. |
| 9,548,960 B2 | 1/2017 | Haramaty et al. |
| 9,571,400 B1 | 2/2017 | Mandal et al. |
| 9,584,429 B2 | 2/2017 | Haramaty et al. |
| 9,699,095 B2 | 7/2017 | Elias et al. |
| 9,729,473 B2 | 8/2017 | Haramaty et al. |
| 9,876,727 B2 | 1/2018 | Gaist et al. |
| 9,985,910 B2 | 5/2018 | Gafni et al. |
| 10,009,277 B2 | 6/2018 | Goldenberg et al. |
| 10,079,782 B2 | 9/2018 | Haramaty et al. |
| 10,200,294 B2 | 2/2019 | Shpiner et al. |
| 10,205,683 B2 | 2/2019 | Elias et al. |
| 10,218,642 B2 | 2/2019 | Mula et al. |
| 10,230,652 B2 | 3/2019 | Haramaty et al. |
| 10,389,646 B2 | 8/2019 | Zdornov et al. |
| 10,554,556 B2 | 2/2020 | Haramaty et al. |
| 10,574,546 B2 | 2/2020 | Levi et al. |
| 10,644,995 B2 | 5/2020 | Levy et al. |
| 11,005,724 B1 | 5/2021 | Shpigelman et al. |
| 11,310,163 B1 | 4/2022 | Lo et al. |
| 11,411,911 B2 | 8/2022 | Levi et al. |
| 2001/0043564 A1 | 11/2001 | Bloch et al. |
| 2001/0043614 A1 | 11/2001 | Viswanadhham et al. |
| 2002/0009073 A1 | 1/2002 | Furukawa et al. |
| 2002/0013844 A1 | 1/2002 | Garrett et al. |
| 2002/0026525 A1 | 2/2002 | Armitage |
| 2002/0039357 A1 | 4/2002 | Lipasti et al. |
| 2002/0067693 A1 | 6/2002 | Kodialam et al. |
| 2002/0071439 A1 | 6/2002 | Reeves et al. |
| 2002/0085586 A1 | 7/2002 | Tzeng |
| 2002/0136163 A1 | 9/2002 | Kawakami et al. |
| 2002/0138645 A1 | 9/2002 | Shinomiya et al. |
| 2002/0141412 A1 | 10/2002 | Wong |
| 2002/0165897 A1 | 11/2002 | Kagan et al. |
| 2002/0176363 A1 | 11/2002 | Durinovic-Johri et al. |
| 2003/0016624 A1 | 1/2003 | Bare |
| 2003/0039260 A1 | 2/2003 | Fujisawa |
| 2003/0065856 A1 | 4/2003 | Kagan et al. |
| 2003/0079005 A1 | 4/2003 | Myers et al. |
| 2003/0097438 A1 | 5/2003 | Bearden et al. |
| 2003/0223453 A1 | 12/2003 | Stoler et al. |
| 2004/0024903 A1 | 2/2004 | Costatino et al. |
| 2004/0062242 A1 | 4/2004 | Wadia et al. |
| 2004/0111651 A1 | 6/2004 | Mukherjee et al. |
| 2004/0202473 A1 | 10/2004 | Nakamura et al. |
| 2005/0013245 A1 | 1/2005 | Sreemanthula et al. |
| 2005/0154790 A1 | 7/2005 | Nagata et al. |
| 2005/0157641 A1 | 7/2005 | Roy |
| 2005/0259588 A1 | 11/2005 | Preguica |
| 2006/0126627 A1 | 6/2006 | Diouf |
| 2006/0143300 A1 | 6/2006 | See et al. |
| 2006/0182034 A1 | 8/2006 | Klinker et al. |
| 2006/0215645 A1 | 9/2006 | Kangyu |
| 2006/0291480 A1 | 12/2006 | Cho et al. |
| 2007/0030817 A1 | 2/2007 | Arunachalam et al. |
| 2007/0058536 A1 | 3/2007 | Vaananen et al. |
| 2007/0058646 A1 | 3/2007 | Hermoni |
| 2007/0070998 A1 | 3/2007 | Sethuram et al. |
| 2007/0091911 A1 | 4/2007 | Watanabe et al. |
| 2007/0104192 A1 | 5/2007 | Yoon et al. |
| 2007/0183418 A1 | 8/2007 | Riddoch et al. |
| 2007/0223470 A1 | 9/2007 | Stahl |
| 2007/0237083 A9 | 10/2007 | Oh et al. |
| 2008/0002690 A1 | 1/2008 | Ver Steeg et al. |
| 2008/0101378 A1 | 5/2008 | Krueger |
| 2008/0112413 A1 | 5/2008 | Pong |
| 2008/0165797 A1 | 7/2008 | Aceves |
| 2008/0186981 A1 | 8/2008 | Seto et al. |
| 2008/0189432 A1 | 8/2008 | Abali et al. |
| 2008/0267078 A1 | 10/2008 | Farinacci et al. |
| 2008/0298248 A1 | 12/2008 | Roeck et al. |
| 2009/0010159 A1 | 1/2009 | Brownell et al. |
| 2009/0022154 A1 | 1/2009 | Kiribe et al. |
| 2009/0097496 A1 | 4/2009 | Nakamura et al. |
| 2009/0103534 A1 | 4/2009 | Malledant et al. |
| 2009/0119565 A1 | 5/2009 | Park et al. |
| 2009/0262741 A1 | 10/2009 | Jungck et al. |
| 2010/0020796 A1 | 1/2010 | Park et al. |
| 2010/0039959 A1 | 2/2010 | Gilmartin |
| 2010/0049942 A1 | 2/2010 | Kim et al. |
| 2010/0111529 A1 | 5/2010 | Zeng et al. |
| 2010/0141428 A1 | 6/2010 | Mildenberger et al. |
| 2010/0189113 A1 | 7/2010 | Csaszar et al. |
| 2010/0216444 A1 | 8/2010 | Mariniello et al. |
| 2010/0284404 A1 | 11/2010 | Gopinath et al. |
| 2010/0290385 A1 | 11/2010 | Ankaiah et al. |
| 2010/0290458 A1 | 11/2010 | Assarpour et al. |
| 2010/0315958 A1 | 12/2010 | Luo et al. |
| 2011/0019673 A1 | 1/2011 | Fernandez |
| 2011/0080913 A1 | 4/2011 | Liu et al. |
| 2011/0085440 A1 | 4/2011 | Owens et al. |
| 2011/0085449 A1 | 4/2011 | Jeyachandran et al. |
| 2011/0090784 A1 | 4/2011 | Gan |
| 2011/0164496 A1 | 7/2011 | Loh et al. |
| 2011/0164518 A1 | 7/2011 | Daraiseh et al. |
| 2011/0225391 A1 | 9/2011 | Burroughs et al. |
| 2011/0249679 A1 | 10/2011 | Lin et al. |
| 2011/0255410 A1 | 10/2011 | Yamen et al. |
| 2011/0265006 A1 | 10/2011 | Morimura et al. |
| 2011/0299529 A1 | 12/2011 | Olsson et al. |
| 2012/0020207 A1 | 1/2012 | Corti et al. |
| 2012/0075999 A1 | 3/2012 | Ko et al. |
| 2012/0082057 A1 | 4/2012 | Welin et al. |
| 2012/0144065 A1 | 6/2012 | Parker et al. |

(56) References Cited

U.S. PATENT DOCUMENTS

| | | |
|---|---|---|
| 2012/0147752 A1 | 6/2012 | Ashwood-Smith et al. |
| 2012/0163797 A1 | 6/2012 | Wang |
| 2012/0170582 A1 | 7/2012 | Abts et al. |
| 2012/0207175 A1 | 8/2012 | Raman et al. |
| 2012/0250500 A1 | 10/2012 | Liu |
| 2012/0250679 A1 | 10/2012 | Judge et al. |
| 2012/0287791 A1 | 11/2012 | Xi et al. |
| 2012/0300669 A1 | 11/2012 | Zahavi |
| 2012/0314706 A1 | 12/2012 | Liss |
| 2013/0044636 A1 | 2/2013 | Koponen et al. |
| 2013/0071116 A1 | 3/2013 | Ong |
| 2013/0083701 A1 | 4/2013 | Tomic et al. |
| 2013/0114599 A1 | 5/2013 | Arad |
| 2013/0114619 A1 | 5/2013 | Wakumoto |
| 2013/0159548 A1 | 6/2013 | Vasseur et al. |
| 2013/0170451 A1 | 7/2013 | Krause et al. |
| 2013/0182604 A1 | 7/2013 | Moreno et al. |
| 2013/0204933 A1 | 8/2013 | Cardona et al. |
| 2013/0208720 A1 | 8/2013 | Ellis et al. |
| 2013/0242745 A1 | 9/2013 | Umezuki |
| 2013/0259033 A1 | 10/2013 | Hefty |
| 2013/0297757 A1 | 11/2013 | Han et al. |
| 2013/0315237 A1 | 11/2013 | Kagan et al. |
| 2013/0322256 A1 | 12/2013 | Bader et al. |
| 2013/0329727 A1 | 12/2013 | Rajagopalan et al. |
| 2013/0336116 A1 | 12/2013 | Vasseur et al. |
| 2013/0336164 A1 | 12/2013 | Yang et al. |
| 2014/0016457 A1 | 1/2014 | Enyedi et al. |
| 2014/0022942 A1 | 1/2014 | Han et al. |
| 2014/0043959 A1 | 2/2014 | Owens et al. |
| 2014/0059440 A1 | 2/2014 | Sasaki et al. |
| 2014/0105034 A1 | 4/2014 | Sun |
| 2014/0140341 A1 | 5/2014 | Bataineh et al. |
| 2014/0169173 A1 | 6/2014 | Naouri et al. |
| 2014/0192646 A1 | 7/2014 | Mir et al. |
| 2014/0198636 A1 | 7/2014 | Thayalan et al. |
| 2014/0211808 A1 | 7/2014 | Koren et al. |
| 2014/0269305 A1 | 9/2014 | Nguyen |
| 2014/0313880 A1 | 10/2014 | Lu et al. |
| 2014/0328180 A1 | 11/2014 | Kim et al. |
| 2014/0343967 A1 | 11/2014 | Baker |
| 2015/0030033 A1 | 1/2015 | Vasseur et al. |
| 2015/0052252 A1 | 2/2015 | Gilde et al. |
| 2015/0092539 A1 | 4/2015 | Sivabalan et al. |
| 2015/0124815 A1 | 5/2015 | Beliveau et al. |
| 2015/0127797 A1 | 5/2015 | Attar et al. |
| 2015/0131663 A1 | 5/2015 | Brar et al. |
| 2015/0163144 A1 | 6/2015 | Koponen et al. |
| 2015/0172070 A1 | 6/2015 | Csaszar |
| 2015/0194215 A1 | 7/2015 | Douglas et al. |
| 2015/0195204 A1 | 7/2015 | Haramaty et al. |
| 2015/0249590 A1 | 9/2015 | Gusat et al. |
| 2015/0295858 A1 | 10/2015 | Chrysos et al. |
| 2015/0372916 A1 | 12/2015 | Haramaty et al. |
| 2016/0012004 A1 | 1/2016 | Arimilli et al. |
| 2016/0014636 A1 | 1/2016 | Bahr et al. |
| 2016/0028613 A1 | 1/2016 | Haramaty et al. |
| 2016/0043933 A1 | 2/2016 | Gopalarathnam |
| 2016/0080120 A1 | 3/2016 | Unger et al. |
| 2016/0080321 A1 | 3/2016 | Pan et al. |
| 2016/0182378 A1 | 6/2016 | Basavaraja et al. |
| 2016/0294715 A1 | 10/2016 | Raindel et al. |
| 2016/0380893 A1 | 12/2016 | Chopra et al. |
| 2017/0054445 A1 | 2/2017 | Wang |
| 2017/0054591 A1 | 2/2017 | Hyoudou et al. |
| 2017/0068669 A1 | 3/2017 | Levy et al. |
| 2017/0070474 A1 | 3/2017 | Haramaty et al. |
| 2017/0163775 A1* | 6/2017 | Ravi ................... H04L 69/326 |
| 2017/0180243 A1 | 6/2017 | Haramaty et al. |
| 2017/0187614 A1 | 6/2017 | Haramaty et al. |
| 2017/0195758 A1 | 7/2017 | Schrans et al. |
| 2017/0244630 A1 | 8/2017 | Levy et al. |
| 2017/0270119 A1 | 9/2017 | Kfir et al. |
| 2017/0286292 A1 | 10/2017 | Levy et al. |
| 2017/0331740 A1 | 11/2017 | Levy et al. |
| 2017/0358111 A1 | 12/2017 | Madsen |
| 2018/0026878 A1 | 1/2018 | Zahavi et al. |
| 2018/0062990 A1 | 3/2018 | Kumar et al. |
| 2018/0089127 A1 | 3/2018 | Flajslik et al. |
| 2018/0139132 A1 | 5/2018 | Edsall et al. |
| 2018/0302288 A1 | 10/2018 | Schmatz |
| 2020/0042667 A1 | 2/2020 | Swaminathan et al. |
| 2020/0067822 A1 | 2/2020 | Malhotra et al. |
| 2020/0136956 A1 | 4/2020 | Neshat |
| 2020/0234146 A1* | 7/2020 | Lee ......................... G06N 3/063 |
| 2022/0014607 A1 | 1/2022 | Pilnik et al. |
| 2022/0045972 A1 | 2/2022 | Aibester et al. |
| 2022/0078104 A1 | 3/2022 | Yallouz et al. |
| 2022/0086848 A1* | 3/2022 | Sharma ................. H04L 47/722 |
| 2022/0103480 A1* | 3/2022 | Chiesa ................ H04L 12/4641 |
| 2022/0182309 A1 | 6/2022 | Bataineh et al. |
| 2022/0360511 A1* | 11/2022 | Raindel ............... H04L 43/0817 |
| 2023/0038307 A1* | 2/2023 | Blendin ................ H04L 47/125 |
| 2023/0209406 A1* | 6/2023 | Hu .......................... H04L 47/28 |
| | | 370/229 |
| 2023/0239233 A1* | 7/2023 | Grandhye ............... H04L 45/24 |
| | | 370/238 |
| 2023/0318980 A1* | 10/2023 | Wei ........................ H04L 65/80 |
| | | 709/219 |

FOREIGN PATENT DOCUMENTS

| | | |
|---|---|---|
| CN | 110719193 A | 1/2020 |
| CN | 11549927 A | 12/2022 |
| WO | 2012037494 A1 | 3/2012 |
| WO | 2015175567 A1 | 11/2015 |
| WO | 2016014362 A1 | 1/2016 |
| WO | 2016105446 A1 | 6/2016 |

OTHER PUBLICATIONS

Leiserson, "Fat-Trees: Universal Networks for Hardware Efficient Supercomputing", IEEE Transactions on Computers, vol. C-34, pp. 892-901, Oct. 1985.

Oehring et al., "On Generalized Fat Trees", Proceedings of the 9th International Symposium on Parallel Processing, Santa Barbara, USA, pp. 37-44, Apr. 1995.

Zahavi, "D-Mod-K Routing Providing Non-Blocking Traffic for Shift Permutations on Real Life Fat Trees", CCIT Technical Report #776, Technion—Israel Institute of Technology, Haifa, Israel, pp. 1-7, Aug. 2010.

Yuan et al., "Oblivious Routing for Fat-Tree Based System Area Networks with Uncertain Traffic Demands", Proceedings of ACM SIGMETRICS—the International Conference on Measurement and Modeling of Computer Systems, pp. 337-348, San Diego, USA, pp. 337-348, Jun. 2007.

Matsuoka, "You Don't Really Need Big Fat Switches Anymore—Almost", IPSJ SIG Technical Reports, vol. 2003, No. 83, pp. 157-162, year 2003.

Kim et al., "Technology-Driven, Highly-Scalable Dragonfly Topology", 35th International Symposium on Computer Architecture, pp. 77-78, Beijing, China, pp. 77-88, Jun. 2008.

Jiang et al., "Indirect Adaptive Routing on Large Scale Interconnection Networks", 36th International Symposium on Computer Architecture, Austin, USA, pp. 220-231, Jun. 2009.

Minkenberg et al., "Adaptive Routing in Data Center Bridges", Proceedings of 17th IEEE Symposium on High Performance Interconnects, New York, USA, pp. 33-41, Aug. 2009.

Kim et al., "Adaptive Routing in High-Radix Clos Network", Proceedings of the 2006 ACM/IEEE Conference on Supercomputing (SC2006), Tampa, USA, pp. 1-11, Nov. 2006.

Infiniband Trade Association, "InfiniBandTM Architecture Specification", vol. 1, Release 1.3, pp. 1-1842, Mar. 3, 2015.

Culley et al., "Marker PDU Aligned Framing for TCP Specification", IETF Network Working Group, RFC 5044, pp. 1-74, Oct. 2007.

Shah et al., "Direct Data Placement over Reliable Transports", IETF Network Working Group, RFC 5041, pp. 1-38, Oct. 2007.

(56) References Cited

OTHER PUBLICATIONS

Martinez et al., "Supporting fully adaptive routing in Infiniband networks", Proceedings of the International Parallel and Distributed Processing Symposium (IPDPS'03), pp. 1-10, Apr. 2003.
Joseph, "Adaptive routing in distributed decentralized systems: NeuroGrid, Gnutella & Freenet", Proceedings of Workshop on Infrastructure for Agents, MAS and Scalable MAS, Montreal, Canada, pp. 1-11, year 2001.
Gusat et al., "R3C2: Reactive Route & Rate Control for CEE", Proceedings of 18th IEEE Symposium on High Performance Interconnects, New York, USA, pp. 50-57, Aug. 2010.
Wu et al., "DARD: Distributed adaptive routing datacenter networks", Proceedings of IEEE 32nd International Conference Distributed Computing Systems, pp. 32-41, Jun. 2012.
Ding et al., "Level-wise scheduling algorithm for fat tree interconnection networks", Proceedings of the 2006 ACM/IEEE Conference on Supercomputing (SC 2006), pp. 1-9, Nov. 2006.
Prisacari et al., "Performance implications of remote-only load balancing under adversarial traffic in Dragonflies", Proceedings of the 8th International Workshop on Interconnection Network Architecture: On-Chip, Multi-Chip, pp. 1-4, Jan. 2014.
Li et al., "Multicast Replication Using Dual Lookups in Large Packet-Based Switches", 2006 IET International Conference on Wireless, Mobile and Multimedia Networks, pp. 1-3, Nov. 2006.
Nichols et al., "Definition of the Differentiated Services Field (DS Field) in the IPv4 and IPv6 Headers", Network Working Group, RFC 2474, pp. 1-20, Dec. 1998.
Microsoft., "How IPv4 Multicasting Works", pp. 1-22, Mar. 28, 2003.
Suchara et al., "Network Architecture for Joint Failure Recovery and Traffic Engineering", Proceedings of the ACM SIGMETRICS joint international conference on Measurement and modeling of computer systems, pp. 97-108, Jun. 2011.
IEEE 802.1Q, "IEEE Standard for Local and metropolitan area networks Virtual Bridged Local Area Networks", IEEE Computer Society, pp. 1-303, May 19, 2006.
Plummer, D., "An Ethernet Address Resolution Protocol," Network Working Group, Request for Comments (RFC) 826, pp. 1-10, Nov. 1982.
Hinden et al., "IP Version 6 Addressing Architecture," Network Working Group, Request for Comments (RFC) 2373, pp. 1-26, Jul. 1998.
Garcia et al., "On-the-Fly 10 Adaptive Routing in High-Radix Hierarchical Networks," Proceedings of the 2012 International Conference on Parallel Processing (ICPP), pp. 279-288, Sep. 2012.
Dally et al., "Deadlock-Free Message Routing in Multiprocessor Interconnection Networks", IEEE Transactions on Computers, vol. C-36, No. 5, pp. 547-553, May 1987.
Nkposong et al., "Experiences with BGP in Large Scale Data Centers:Teaching an old protocol new tricks", pp. 1-44, Jan. 31, 2014.
"Equal-cost multi-path routing", WIKIPEDIA, pp. 1-2, Oct. 13, 2014.
Thaler et al., "Multipath Issues in Unicast and Multicast Next-Hop Selection", Network Working Group, RFC 2991, pp. 1-9, Nov. 2000.
Glass et al., "The turn model for adaptive routing", Journal of the ACM, vol. 41, No. 5, pp. 874-902, Sep. 1994.
Mahalingam et al., "VXLAN: A Framework for Overlaying Virtualized Layer 2 Networks over Layer 3 Networks", Internet Draft, pp. 1-20, Aug. 22, 2012.
Sinha et al., "Harnessing TCP's Burstiness with Flowlet Switching", 3rd ACM SIGCOMM Workshop on Hot Topics in Networks (HotNets), pp. 1-6, Nov. 11, 2004.
Vishnu et al., "Hot-Spot Avoidance With Multi-Pathing Over InfiniBand: An MPI Perspective", Seventh IEEE International Symposium on Cluster Computing and the Grid (CCGrid'07), pp. 1-8, year 2007.
NOWLAB—Network Based Computing Lab, pp. 1-2, years 2002-2015, as downloaded from http://nowlab.cse.ohio-state.edu/publications/conf-presentations/2007/vishnu-ccgrid07.pdf.
Alizadeh et al., "CONGA: Distributed Congestion-Aware Load Balancing for Datacenters", Cisco Systems, pp. 1-12, Aug. 9, 2014.
Geoffray et al., "Adaptive Routing Strategies for Modern High Performance Networks", 16th IEEE Symposium on High Performance Interconnects (HOTI '08), pp. 165-172, Aug. 2008.
Anderson et al., "On the Stability of Adaptive Routing in the Presence of Congestion Control", IEEE INFOCOM, pp. 1-11, year 2003.
Perry et al., "Fastpass: A Centralized "Zero-Queue" Datacenter Network", M.I.T. Computer Science & Artificial Intelligence Lab, pp. 1-12, year 2014.
Afek et al., "Sampling and Large Flow Detection in SDN", SIGCOMM '15, London, UK, pp. 345-346, Aug. 2015.
Amante et al., "IPv6 Flow Label Specification", Request for Comments: 6437, pp. 1-15, Nov. 2011.
Cao et al., "Implementation Method for High-radix Fat-tree Deterministic Source-routing Interconnection Network", Computer Science, vol. 39, issue 12, pp. 33-37, year 2012.
Shpiner et al., "Dragonfly+: Low Cost Topology for Scaling Datacenters", IEEE 3rd International Workshop on High-Performance Interconnection Networks in the Exascale and Big-Data Era (HiPINEB), pp. 1-9, Feb. 2017.
Zahavi et al., "Distributed Adaptive Routing for Big-Data Applications Running on Data Center Networks," Proceedings of the Eighth ACM/IEEE Symposium on Architectures for Networking and Communication Systems, New York, USA, pp. 99-110, Oct. 2012.
MELLANOX White Paper, "The SHIELD: Self-Healing Interconnect, " pp. 1-2, year 2019.
Ronen et al., U.S. Appl. No. 17/353,869, filed Jun. 22, 2021.
Valadarsky et al., "Xpander: Towards Optimal-Performance Datacenters," Proceedings of CoNEXT '16, pp. 205-219, Dec. 2016.
Bilu et al., "Lifts, Discrepancy and Nearly Optimal Spectral Gap*," Combinatorica, vol. 26, No. 5, Bolyai Society—Springer-Verlag, pp. 495-519, year 2006.
Zhao et al., "Recovery Strategy from Network Multi-link Failures Based on Overlay Network Constructing Technique," Bulletin of Science and Technology, vol. 32, No. 10, pp. 170-239, Oct. 2016.
CN Application # 202210593405.5 Office Action dated Sep. 15, 2023.
Nkposong et al., "Experiences with BGP in Large Scale Data Centers: Teaching an Old Protocol New Tricks", pp. 1-47, JANOG33 Meeting (Japan Network Operators' Group), Beppu City, Japan, Jan. 23-24, 2014.
U.S. Appl. No. 17/539,252 Office Action dated Apr. 26, 2023.
U.S. Appl. No. 17/353,869 Office Action dated Jun. 9, 2023.
Infiniband Trade Association, "Supplement to Infiniband Architecture Specification," vol. 1, release 1.2.1—Annex A17: RoCEv2, pp. 1-23, Sep. 2, 2014.
Infiniband Trade Association, "InfiniBand Architecture Specification," vol. 1, Release 1.5, Jun. 2, 2021, Draft, Table 6 (Base Transport Header Fields), pp. 1-2, year 2021.
Cisco, "Cisco ACI Remote Leaf Architecture—White Paper," pp. 1-83, updated Jan. 22, 2020.
Gandelman et al., U.S. Appl. No. 17/539,252, filed Dec. 1, 2021.
Thulasiraman et al., "Logical Topology Augmentation for Guaranteed Survivability Under Multiple Failures in IP-over-WDM Optical Network, " 2009 IEEE 3rd International Symposium on Advanced Networks and Telecommunication Systems (ANTS), pp. 1-3, year 2009.
Nastiti et al., "Link Failure Emulation with Dijkstra and Bellman-Ford Algorithm in Software Defined Network Architecture," Abstract of Case Study: Telkom University—Topology, 2018 6th IEEE Conference on Information and Communication Technology (ICoICT), pp. 135-140, year 2018.
Kamiyama et al., "Network Topology Design Considering Detour Traffic Caused by Link Failure," Networks 2008—The 13th International Telecommunications Network Strategy and Planning Symposium, pp. 1-8, year 2008.
Almog et al., U.S. Appl. No. 17/990,686, filed Nov. 20, 2022.

* cited by examiner

FLEXIBLE PER-FLOW MULTIPATH MANAGED BY SENDER-SIDE NETWORK ADAPTER

TECHNICAL FIELD

Embodiments described herein relate generally to packet communication networks, and particularly to methods and systems for multipath management in such networks.

BACKGROUND

Various packet networks allow sending packets from a source to a destination over multiple paths. For example, the Equal-cost multi-path (ECMP) routing scheme, implemented, e.g., in network switches or routers, allows forwarding different flows over multiple best paths with equal routing priority.

SUMMARY

An embodiment that is described herein provides a network adapter, including a port and one or more circuits. The port is to communicate packets over a network in which switches forward the packets in accordance with tuples of the packets. The one or more circuits are to hold a user-programmable scheme specifying one or more assignments of the packets of a given flow, which is destined to a peer node coupled to the network, to multiple sub-flows having respective different tuples, assign first packets of the given flow to one or more of the sub-flows of the given flow in accordance with the user-programmable scheme, by setting one or more respective tuples of the first packets, transmit the first packets to the peer node via the port. The one or more circuits are further to monitor one or more notifications received from the network, the notifications being indicative of respective states of the sub-flows, and based on the received notifications and on the user-programmable scheme, determine an assignment of second packets of the given flow to the sub-flows, and transmit the second packets to the peer node via the port.

In some embodiments, by setting different tuples to the different sub-flows, the one or more circuits in the network adapter are to cause the switches in the network to forward at least two of the sub-flows over different paths in the network. In other embodiments, the one or more circuits are to assign tuples having different source port numbers to different respective sub-flows of the given flow. In yet other embodiments, the one or more circuits are to provide an Application Programming Interface (API) for a user to specify the user-programmable scheme.

In an embodiment, the one or more circuits are to assign the first packets to a first sub-flow, and to assign the second packets to a second sub-flow, different from the first sub-flow. In another embodiment, the one or more circuits are to assign the second packets to the second sub-flow in response to the notifications being indicative of congestion or link failure on a path in the network traversed by the first sub-flow. In yet another embodiment, the one or more circuits are to determine the assignment of the second packets in response to receiving from the network notifications indicative of underutilization in sending the first sub-flow to the peer node.

In some embodiments, the one or more circuits are to distribute third packets of the given flow among multiple sub-flows in accordance with a distribution assignment. In other embodiments, the one or more circuits are to distribute the third packets among the multiple sub-flows, when the peer node supports receiving the third packets in an order different from a transmission order by the network adapter. In yet other embodiments, the one or more circuits are to, in response to receiving one or more notifications indicative that a network performance criterion is violated while distributing the third packets, reassign the third packets to a selected sub-flow among the sub-flows of the given flow.

In an embodiment, the one or more circuits are to distribute the first packets among the sub-flows in accordance with a first distribution scheme, and to distribute the second packets among the sub-flows in accordance with a second distribution scheme, different from the first distribution scheme. In another embodiment, the switches in the network support an adaptive routing scheme in which a switch adaptively selects a path to the peer node from among multiple paths, and the one or more circuits are to mark the packets of the given flow with an indication signaling to the switches whether to locally select paths for the packets of the given flow based on the tuples of the packets or using the adaptive routing scheme. In yet another embodiment, the one or more circuits are to mark the packets of the given flow with the indication for selecting paths using the adaptive routing scheme, and in response to receiving notifications indicative of a variation among Round-Trip Time (RTT) measurements corresponding to different paths exceeding a threshold variation, mark subsequent packets of the given flow with the indication for selecting paths based on the tuples.

In some embodiments, the one or more circuits are to mark the packets with the indication for selecting paths using the tuples up to a predefined hop, and for selecting paths using the adaptive routing scheme for one or more hops following the predefined hop.

There is additionally provided, in accordance with an embodiment that is described herein, a method for communication, including, in a network adapter including a port, communicating via the port packets over a network in which switches forward the packets in accordance with tuples of the packets. A user-programmable scheme is held, specifying one or more assignments of the packets of a given flow, which is destined to a peer node coupled to the network, to multiple sub-flows having respective different tuples. First packets of the given flow are assigned to one or more of the sub-flows of the given flow in accordance with the user-programmable scheme, by setting one or more respective tuples of the first packets. The first packets are transmitted to the peer node via the port. One or more notifications received from the network are monitored, the notifications being indicative of respective states of the sub-flows. Based on the received notifications and on the user-programmable scheme, an assignment of second packets of the given flow to the sub-flows is determined, and the second packets are transmitted to the peer node via the port.

These and other embodiments will be more fully understood from the following detailed description of the embodiments thereof, taken together with the drawings in which:

DETAILED DESCRIPTION OF EMBODIMENTS

Overview

Embodiments that are described herein provide methods and systems for managing the traversal of packets belonging to a common flow to a destination over multiple paths in the network. The multipath management is carried out by a sender-side network adapter from which the flow in question originates.

A communication network typically comprises multiple interconnected network devices such as switches or routers, wherein each network device forwards incoming packets to their destinations using a suitable forwarding scheme.

In principle, packet routing within switches could be based on flow identifiers. For example, the switch forwards packets of different flows via different paths, e.g., for balancing traffic load across the network. In such a routing scheme, all packets belonging to a given flow traverse the same path to the destination across the network. A forwarding scheme of this sort may be suitable for packets that require strict packet ordering but may result in poor network utilization in certain cases. Moreover, conventional hash-based routing at the flow level is typically incapable of mitigating network events such congestion and/or a link failure.

In the disclosed embodiments, a sender-side Network Interface Controller (NIC) manages per-flow multipath delivery of packets that require no strict ordering at the destination. To this end, the sender-side NIC associates a flow with multiple sub-flows dedicated to that flow, and the network switches are preconfigured to forward the sub-flows to different respective egress ports (resulting in different respective paths). The sub-flows of a given flow are associated with respective sub-flow identifiers (e.g., tuples), so that packets of the given flow having different sub-flow identifiers may be routed across the network via different paths.

Consider an embodiment of a network adapter comprising a port and one or more circuits. The port is to communicate packets over a network in which switches forward the packets in accordance with tuples of the packets. The one or more circuits are to hold a user-programmable scheme specifying one or more assignments of the packets of a given flow, which is destined to a peer node coupled to the network, to multiple sub-flows having respective different tuples, assign first packets of the given flow to one or more of the sub-flows of the given flow in accordance with the user-programmable scheme, by setting one or more respective tuples of the first packets, transmit the first packets to the peer node via the port, monitor one or more notifications received from the network, the notifications being indicative of respective states of the sub-flows, based on the received notifications and on the user-programmable scheme, determine an assignment of second packets of the given flow to the sub-flows, and transmit the second packets to the peer node via the port.

By setting different tuples to the different sub-flows, the network adapter causes the switches in the network to forward at least two of the sub-flows over different paths in the network.

The network adapter may determine tuples for packets assigned to different respective sub-flows in various ways. In an example embodiment, the one or more circuits assign tuples having different source port numbers to different respective sub-flows of the given flow. For example, the four Least Significant Bits (LSBs) of the source port number define sixteen sub-flows of the given flow.

In some embodiments, the one or more circuits provide one or more Application Programming Interfaces (APIs) for a user to specify the user-programmable scheme. Using the APIs, a user may provision assignments of packets to sub-flows to meets his own requirements.

The network adapter may assign packets to sub-flows in various ways. For example, with a "static assignment" a single sub-flow is assigned to a sequence of packets, causing them to traverse a common path to the destination. A static assignment is applicable, for example, for packets that require strict packet order. With a "distribution assignment" packets in a sequence are assigned at least two different sub-flows, causing these packets to traverse at least two different paths to the destination. With a distribution assignment, the network adapter may select sub-flows for a sequence of packets in any suitable order, e.g., using a predefined order or randomly. A distribution assignment may be applicable, for example, for balancing load in the network.

In some embodiments, transition among different assignments is also supported. For example, a transition from a first sub-flow to another sub-flow may be applied upon receiving from the network notifications indicative of congestion or link failure on a path in the network traversed by the first sub-flow.

Using a static assignment for a single sub-flow may result in underutilization of network resources. In the present context the term "utilization" refers to the percentage of the total bandwidth of the network being used. For example, if the network supports a data rate of 100 Gb/s but the actual data rate is 70 Gb/s, the network performs at 70% utilization. The term "underutilization" means that the network performs below a specified utilization level.

Consider for example a first path whose bandwidth is split equally between flows denoted 'a' and 'b', and a second path traversing another flow denoted 'c' occupying only 50% of the second path bandwidth. In this example the network is underutilized. If flow 'a' is distributed equally between the first and second paths, the first path is split equally between flows 'a' and 'b', and the second path is split equally between flows 'a' and 'c', the network is fully utilized.

In some embodiments, the one or more circuits transition from a static assignment of a single sub-flow to a distribution assignment, in response to receiving from the network notifications indicative of underutilization in sending the single sub-flow to the peer node.

In some embodiments, the one or more circuits apply a distribution assignment to third packets of the given flow, when the peer node supports receiving the third packets in an order different from a transmission order by the network adapter. While distributing the third packets among the sub-flows, and in response to receiving from the network notifications indicative of a performance criterion being violated (due to the distribution), the one or more circuits reassign the third packets to a selected sub-flow among the sub-flows of the given flow.

In some embodiments, the one or more circuits are to distribute the first packets among the sub-flows in accordance with a first distribution scheme, and to distribute the second packets among the sub-flows in accordance with a second distribution scheme, different from the first distribution scheme.

In some embodiments, the switches in the network support an adaptive routing scheme in which a switch adaptively selects a path to the peer node from among multiple paths. In such embodiments, the one or more circuits are to mark the packets of the given flow with an indication signaling to the switches whether to locally select paths for the packets of the given flow based on the tuples of the packets or using the adaptive routing scheme.

In some embodiments, the one or more circuits are to mark the packets of the given flow with the indication for selecting paths using the adaptive routing scheme, and in response to receiving notifications indicative of a variation among Round-Trip Time (RTT) measurements corresponding to different paths exceeding a threshold variation, mark subsequent packets of the given flow with the indication for selecting paths based on the tuples.

Adaptive routing may be applied in only a subset of the switches. For example, the one or more circuits mark the packets with the indication for selecting paths using the tuples up to a predefined hop, and for selecting paths using the adaptive routing scheme for one or more hops following the predefined hop.

In the disclosed techniques, a sender-side network adapter assigns packets of a given flow to multiple sub-flows, each of which traversing a different path to the destination via the network. The network adapter monitors performance in delivering packets of currently assigned (and possibly other) sub-flows of the given flow and can reassign subsequent packets to the sub-flows differently, to optimize performance. The disclosed embodiments improve fabric utilization, for example, when the network traffic includes a small number of high-bandwidth flows, which configuration is prone to result in underutilization. Moreover, the network adapter performs path transitions much faster than the underlying transport layer protocol can.

System Description

Figure 1:
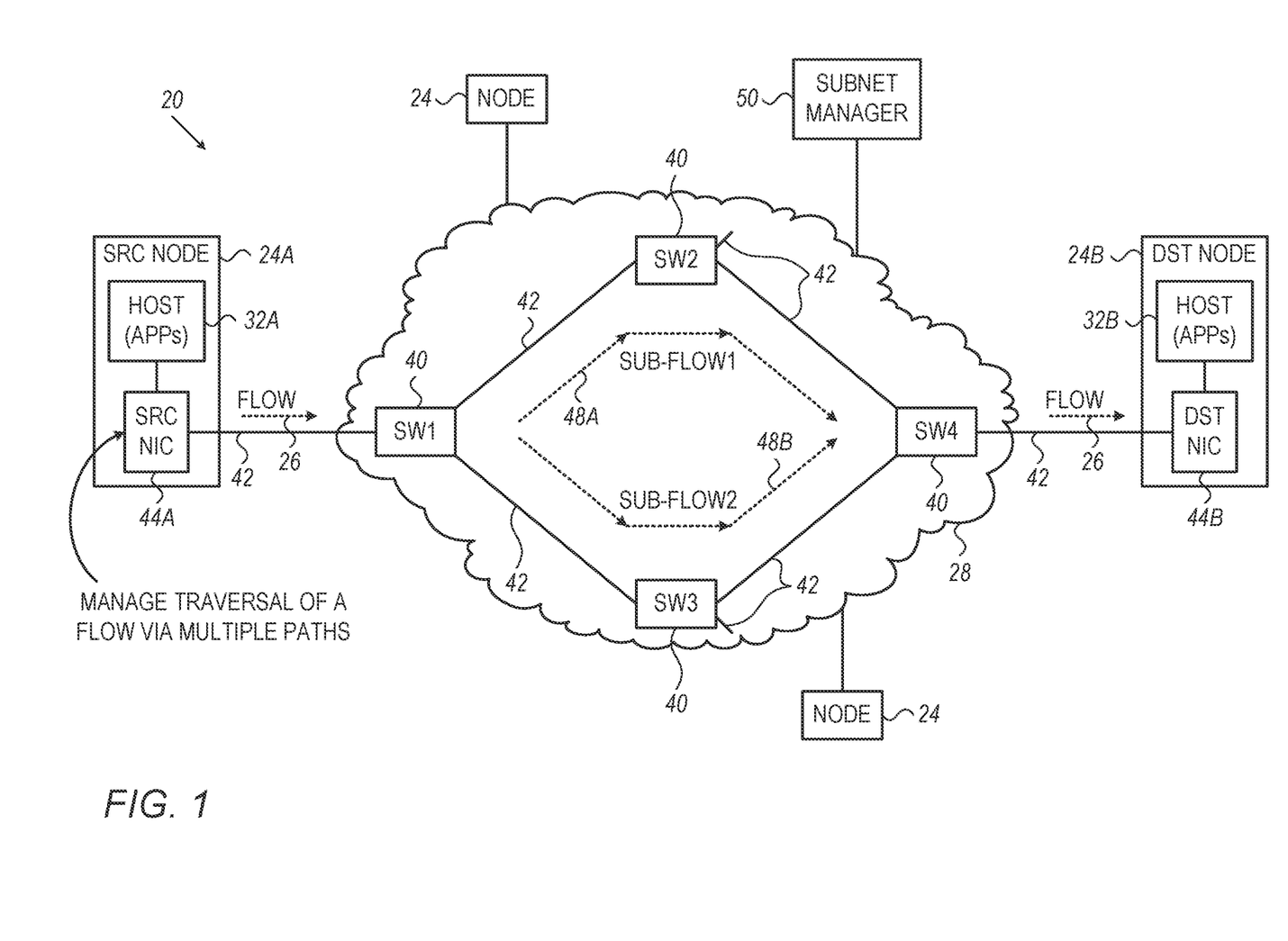
FIG. 1 is a block diagram that schematically illustrates a computer system in which a sender-side network adapter manages the traversal of packets belonging to a common flow via multiple paths through a communication network, in accordance with an embodiment that is described herein.

FIG. 1 is a block diagram that schematically illustrates a computer system 20 in which a sender-side network adapter manages the traversal of packets belonging to a common flow via multiple paths through a communication network, in accordance with an embodiment that is described herein.

Computer system 20 comprises network nodes 24 communicating with one another over a communication network 28. In the present example, a source node 24A sends packets belonging to a common flow 26 to a destination node 24B over communication network 28.

Computer system 20 may be used, for example, in high-rate communication applications such as, for example, in High-Performance Computing (HPC) environments, data centers, storage networks, Artificial Intelligence (AI) clusters, and in providing cloud services.

Communication network 28 may comprise any suitable type of a communication network, operating using any suitable communication protocols. For example, communication network 28 may comprise an Ethernet network in which packets are communicated using the Transmission Control Protocol (TCP) and the Internet Protocol (IP). As another example, communication network 28 may comprise an InfiniBand™ fabric. Communication over network 28 may be based, for example, on the Remote Direct Memory Access (RDMA) over Converged Ethernet (RoCE) protocol, which is a RDMA protocol (implementing an InfiniBand transport layer) over IP and Ethernet.

Communication network 28 comprises multiple network devices 40, interconnected by links 42 in any suitable topology. In the present example network devices 40 comprise network switches, also referred to simply as "switches" for brevity. Alternatively or additionally, communication network 28 may comprise other suitable network devices such as routers.

In some embodiment, a Subnet Manager (SM) 50 is coupled to communication network 28. Among other tasks SM 50 configures switches 40, collects information indicative of network performance, network events causing degraded performance, and the like. Such information may be used by a user for optimizing network performance.

Network nodes 24 (including source node 24A and destination node 24B) are coupled to communication network 28 using a suitable network adapter or Network Interface Controller (NIC) 44. In FIG. 1, source node 24A and destination node 24B are coupled to the communication network using NIC 44A and NIC 44B, respectively. Regarding other nodes 24 and SM 50, the network adapter or NIC is omitted form the figure for the sake of clarity.

In the example of FIG. 1, host 32A of source node 24A sends packets of flow 26, via NIC 44A and over communication network 28, to host 32B of destination node 24B. The packets of flow 26 may originate, for example, from an application program running on host 32A, and destined to be delivered to a peer application program running on host 32B, in an embodiment.

In general, a source node (e.g., 24A) may send over communication network 28 one or more flows, and a destination node (e.g., 24B) may receive from the communication network one or more flows.

In some embodiments, switches 40 forward packets using a hash-based forwarding scheme that applies a sub-flow level routing scheme, in contrast to conventional flow level hash-based routing schemes such as the Equal-cost multipath (ECMP) scheme.

In some embodiments, the sub-flow level hash-based routing scheme employed by switches 40 specifies for a given flow a group of multiple egress ports corresponding to respective sub-flows. In such embodiments, packets of a common flow may be assigned to different sub-flows of that flow by setting tuples of the packets. Since different tuples of the sub-flows produce different hash results with high probability, packets assigned to different sub-flows traverse different paths to the destination through the communication network. The tuples may comprise, for example, five-tuples that differ from one another, e.g., in the User Datagram Protocol (UDP) source port number and share the same source and destination addresses and destination port. In alternative embodiments other methods for setting the tuples to assign packets to sub-flows can also be used.

In the example of FIG. 1, NIC 44A may assign each packet of flow 26 to one of sub-flows 48A and 48B denoted SUB-FLOW1 and SUB-FLOW2, respectively. In this example, assigning the packets to SUB-FLOW1 causes them to traverse a path from source node 24A to destination node 24B, including switches SW1, SW2 and SW4. The packets assigned to SUB-FLOW2, on the other hand, traverse a different path including SW1, SW3 and SW4. In FIG. 1, flow 26 is associated with just two sub-flows for the sake of clarity. In alternative embodiments, a flow may be associated with any other suitable number of sub-flows larger than two, e.g., 8 or 16 sub-flows.

As will be described below, NIC 44A may assign to each packet of a given flow one of the sub-flows of that flow, to optimize performance e.g., based on states of the sub-flows reported by elements of the network.

A Sender-Side NIC Managing Per-Flow Multipath

Figure 2:
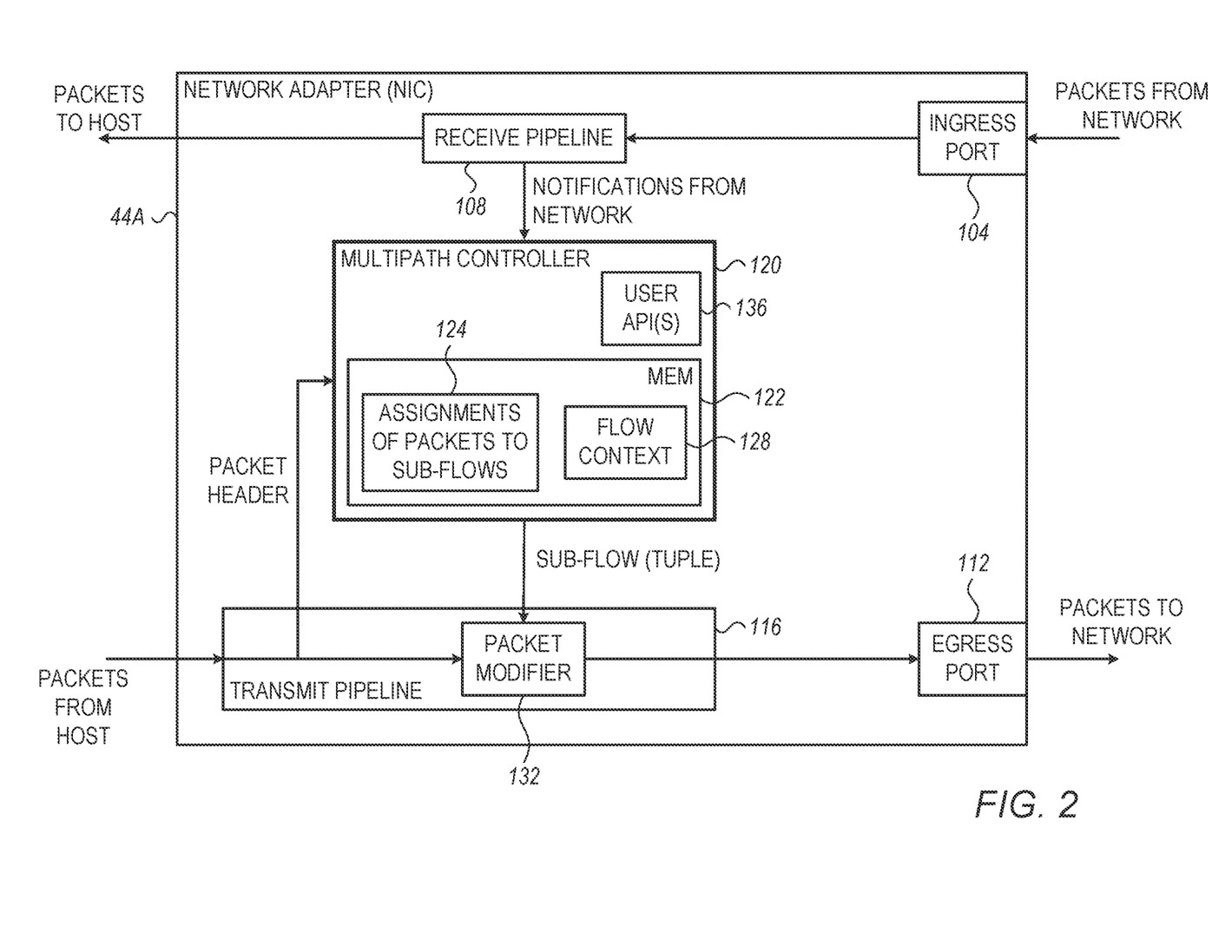
FIG. 2 is a block diagram that schematically illustrates an example implementation of a NIC managing per-flow multipath, in accordance with an embodiment that is described herein.

FIG. 2 is a block diagram that schematically illustrates an example implementation of NIC 44A managing per-flow multipath, in accordance with an embodiment that is described herein.

As noted above, NIC 44A is coupled to communication network 28 on one side, and to host 32A of source node 24A on the other side. NIC 44A thus mediates between the host and the communication network.

In the receive direction, NIC 44A receives packets from communication network 28 via an ingress port 104. A receive (Rx) pipeline 108 processes the received packets and sends the processed packets to host 32A. In the transmit direction, NIC 44A receives from host 32A packets for transmission. A transmit (Tx) pipeline 116 processes the packets and transmits them to communication network 28 via an egress port 112.

NIC 44A comprises a multipath controller 120 (also referred to simply as "controller" for brevity) that controls the traversal of packets belonging to a common flow, via multiple paths in communication network 28, to the same destination node (e.g., 24B). To this end, the controller assigns packets of the common flow to multiple sub-flows of that flow, wherein the sub-flows are associated with different respective tuples carried in the packets of the flow. Moreover, switches 40 in communication network 28 are configured to forward the different sub-flows via different paths to the destination, based on the tuples. The tuples thus serve as sub-flow identifiers. In some embodiments, NIC 44A applies a suitable hash function to the tuple to generate a corresponding sub-flow identifier.

In some embodiments, controller 120 comprises a memory 122 holding for a given flow (e.g., flow 26) a user-programmable scheme 124 and a flow context 128. The user-programmable scheme 124 specifies one or more assignments of packets belonging to the given flow to multiple respective sub-flows having respective different tuples. Upon receiving in Tx pipeline 116 a packet from the host, controller 120 selects a sub-flow (or a tuple) for the packet, based at least on information extracted from the packet's header, and on one of the assignments in user-programmable scheme 124.

In some embodiments, controller 120 selects a sub-flow for the packet also based on notifications received from the network via Rx pipeline 108, the notifications being indicative of respective states of the sub-flows of the given flow. Controller 120 thus monitors the network performance per sub-flow and can reassign subsequent packets of the given flow to the sub-flows so as to improve the performance.

In some embodiments, controller 120 reassigns the packets to the sub-flows, e.g., transitions from the currently used assignment to a different assignment, in response to detecting that a performance criterion has been violated. In one such embodiment, the controller detects a performance criterion violation when the path traversed by the current sub-flow is congested or contains a failing link. In another embodiment, the controller detects a performance criterion violation when the delay along a path traversed by the current sub-flow exceeds a delay threshold.

Various types of notifications can be used for monitoring the network performance, e.g., end-to-end notifications at the sub-flow level. For example, with the RDMA over Converged Ethernet (RoCE) protocol, the destination node may send back to the source node a Negative Acknowledgement Notification (NACK) or a Congestion Notification Packet (CNP). A NACK may be indicative of missing packets in a sub-flow. A CNP is indicative of congestion or a link failure occurring along the path traversed by a sub-flow. As another example, in an embodiment, the destination node sends telemetry information to the source node such as Round-Trip Time (RTT) measurements.

In some embodiments, NIC 44A monitors the performance of multiple sub-flows of the same flow. The NIC may monitor sub-flows that are not used by the current assignment, by sending RTT probe packets on these sub-flows. In such embodiments controller 120 may transition from the current sub-flow to another sub-flow when the RTT measured for other sub-flow is lower than the RTT measured for the current sub-flow.

Another type of a notification that is indicative of a link failure can be reported by network switches 40 to the source node in response to detecting a link failure by identifying a corresponding timeout expiration.

Tx pipeline 116 comprises a packet modifier 132 that based on the sub-flow selected by controller 120, sets a corresponding tuple value in the header of the packet. The TX pipeline transmits the packet output by the packet modifier to communication network 28 via egress port 112.

In some embodiments, controller 120 manages stateful assignments of packets to sub-flows of a given flow using flow context 128. The flow context may store any suitable information required for managing per-flow multipath, such as one or more sub-flow identifiers of the sub-flows assigned to recently transmitted packets of the given flow, the assignment in user-programmable scheme 124 currently selected for the given flow, network states of one or more recently assigned sub-flows, and the like. Controller 120 uses the information in flow context 128 in selecting subsequent assignments and sub-flows.

In some embodiments, controller 120 comprises one or more user Application Programming Interfaces (APIs) 136. User APIs 136 allow flexible provisioning of assignments to user-programmable scheme 124 for meeting users' own requirements.

In some embodiments, based on the information collected from the network by SM 50, a user may define suitable assignments of packets to sub-flows of a given flow, and provision these assignments to user-programmable scheme 124 via user APIs 136.

Example Assignments of Packets to Sub-Flows

FIGS. 3A-3D are diagrams that schematically illustrate example assignments of packets to sub-flows, in accordance with embodiments that are described herein.

In describing FIGS. 3A-3D it is assumed that a controller 120 supports assignments of packets of a common flow to 16 sub-flows denoted SF1 . . . SF16. Assignments such as those depicted in FIGS. 3A-3D (as well as other assignments) may be provisioned to user-programmable scheme 128 using APIs 136, in an embodiment.

Figure 3A:
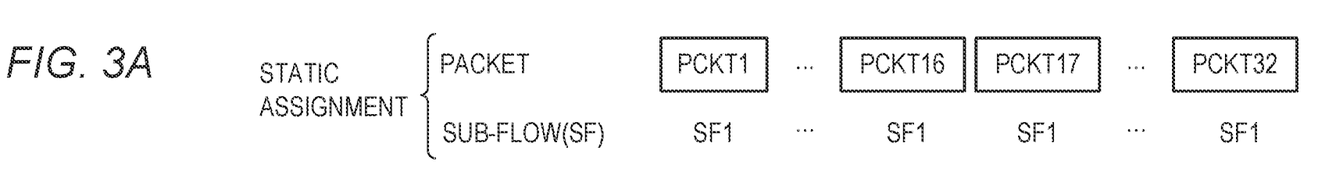
FIGS. 3A-3D are diagrams that schematically illustrate example assignments of packets to sub-flows, in accordance with embodiments that are described herein.

FIG. 3A depicts an assignment in which a sequence of consecutive packets belonging to a common flow are assigned to a single sub-flow. Such an assignment is also referred to herein as a "static assignment". In the example of FIG. 3A, all 32 packets in a sequence are assigned to the same sub-flow SF1.

Figure 3B:
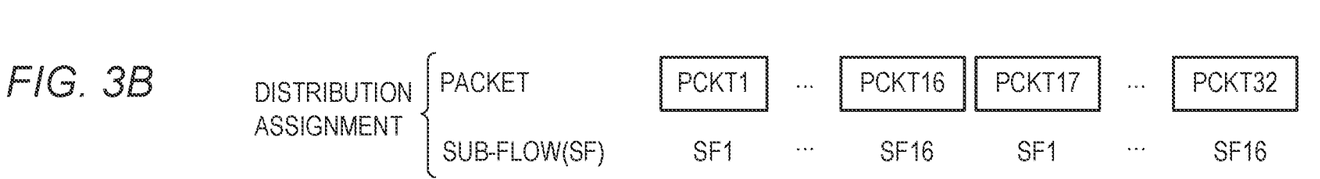

FIG. 3B depicts an assignment in which a sequence of consecutive packets belonging to a common flow are assigned to two or more different sub-flows. Such an assignment is also referred to herein as a "distribution assignment" or "spray assignment". Distribution assignments may be specified in various ways. For example, the packets in the sequence may be assigned to different respective predetermined sub-flows (a deterministic distribution scheme such as, for example, based on a round robin approach). As another example, the packets in the sequence may be assigned randomly to the sub-flows (a random distribution assignment). A distribution assignment may be used, for example, for improving network utilization, e.g., by distributing a flow over multiple paths at the same time. In the example of FIG. 3B, 16 consecutive packets are assigned to different respective sub-flows SF1 . . . SF16.

In some embodiments, the sub-flows of a distribution assignment are selected with the same priority. In other embodiments, the NIC selects different sub-flows of the distribution assignment with different respective priorities, e.g., by associating the sub-flows with respective weights. For example, the weights may be assigned depending on respective path loads, e.g., a loaded path gets lower priority than a less loaded path.

Some of the assignments in user-programmable scheme 124 specify rules for transitioning among assignments, e.g., depending on notifications received from the communication network. User-programmable scheme 124 comprises rules specifying transitions among assignments, e.g., a rule specifying conditions for starting and stopping the application of a distribution assignment, a rule specifying conditions for transitioning from a static assignment to another static assignment, and the like.

Figure 3C:
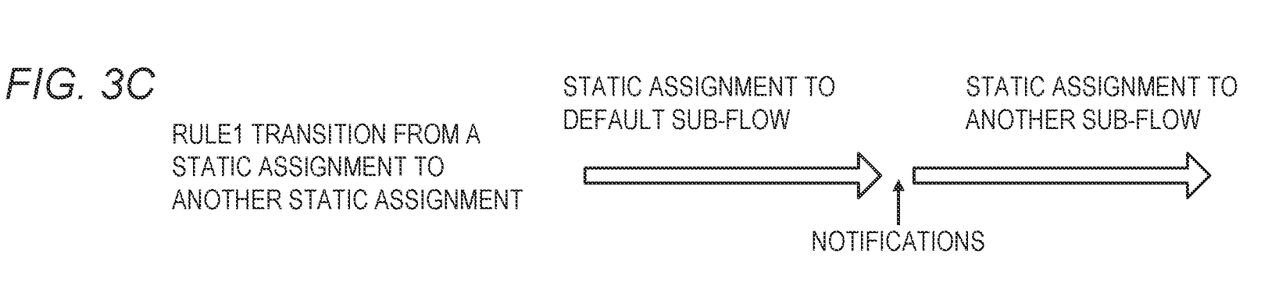

FIG. 3C depicts a rule specifying transition from one static assignment to another static assignment, based on the received notifications. In the example of FIG. 3C the packets of the flow are first assigned to a default sub-flow and then to another sub-flow. In an embodiment, NIC 44A applies the sub-flow transition after all prior RDMA Read and Atomic operations on the same Send Queue (SQ) of a corresponding reliable Queue Pair (QP) have completed (a method of this sort is also referred to as a "fence" method). It is noted that a fence is required for flows not supporting out of order reception.

The assignment rule in FIG. 3C may be applicable in various scenarios. For example, when the notifications indicate that the path corresponding to the default sub-flow is congested or contains a failing link, controller 120 may assign subsequent packets of the flow to another sub-flow, to bypass the point of congestion or the failing link. As another example, when the notifications indicate that the bandwidth of the traffic traversing the path corresponding to the default sub-flow is too high, the controller may assign subsequent packets of the flow to another sub-flow traversing a path having sufficient bandwidth.

In some embodiments, NIC 44A searches for a suitable sub-flow by attempting several static assignments. The search process may be triggered in response to the NIC detecting that the delay of the path traversed by the current sub-flow exceeds a threshold delay. The search process continues, for example, until finding a sub-flow for which the delay is lower than a threshold delay.

Figure 3D:
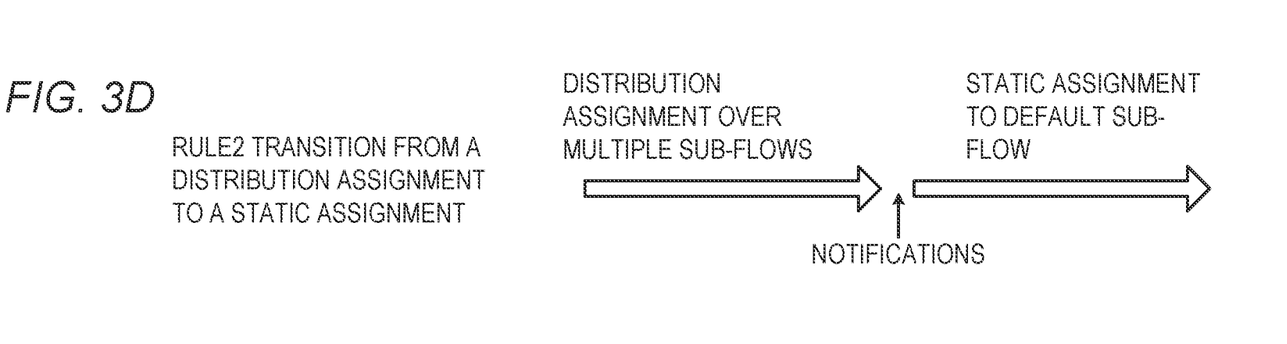

FIG. 3D depicts a rule specifying transition from a distribution assignment to a static assignment, based on the received notifications. In the example of FIG. 3D, controller 120 starts with a distribution assignment over 16 sub-flows, and then transitions to a static assignment, e.g., specifying a default sub-flow. The assignment rule in FIG. 3D may applicable, for example, when the notifications indicate poor performance in delivering at least one of the sub-flows of the current distribution assignment. The assignment rule in FIG. 3D is also applicable when the flow in question does not support out of order reception for a certain amount of data, e.g., a multi-packet message, in which case the NIC transitions to a static assignment for a period of sending the message (and typically applies a fence, as described above).

The example assignments and rules depicted in FIGS. 3A-3D are given by way of example and other suitable assignments and rules can also be used. For example, an assignment rule may specify transitions among different distribution assignments, e.g., between a deterministic distribution assignment and a random distribution assignment. Random distribution is applicable, for example, in noisy networks, by breaking symmetry of deterministic patterns.

Methods for Controlling Per-Flow Multipath by Sender NIC

Figure 4:
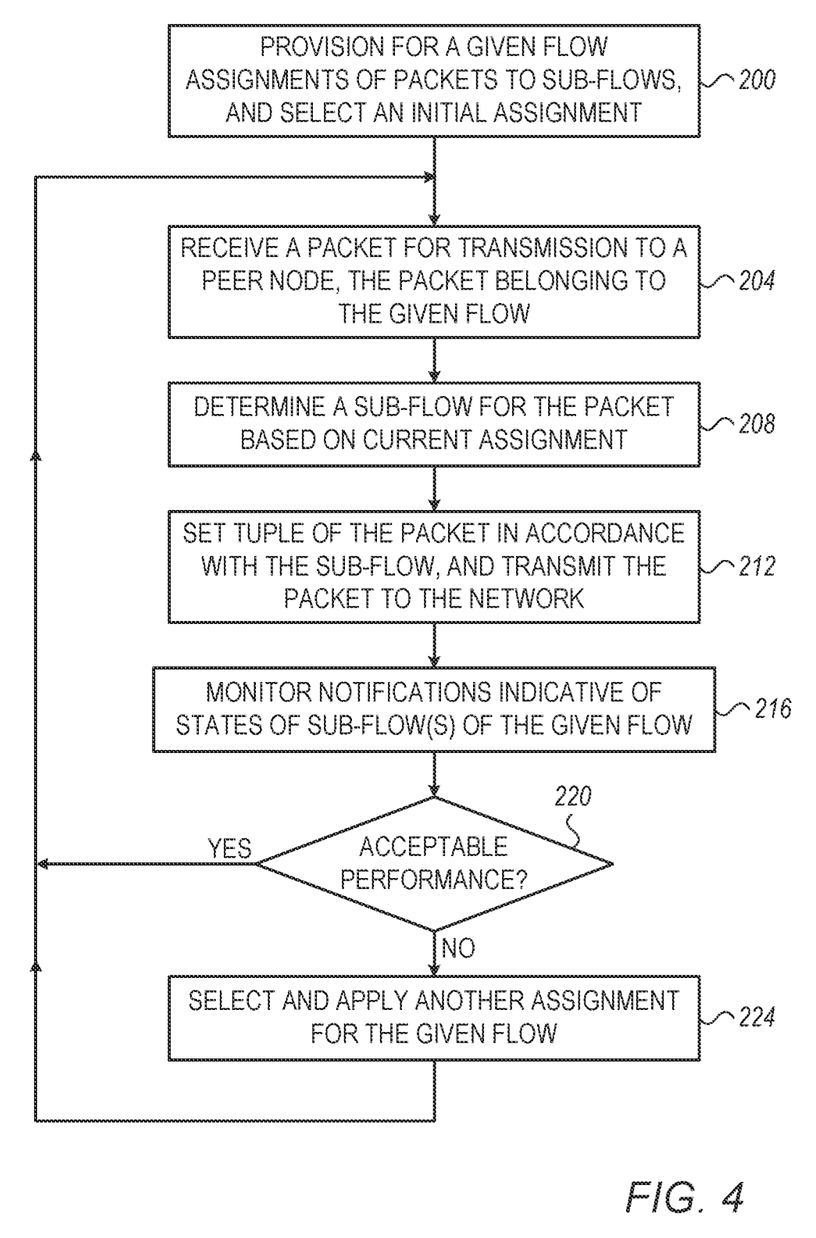
FIG. 4 is a flow chart that schematically illustrates a method for controlling the traversal of packets of a common flow via multiple paths through a communication network, in accordance with an embodiment that is described herein.

FIG. 4 is a flow chart that schematically illustrates a method for controlling the traversal of packets of a common flow via multiple paths through a communication network.

The method will be described as executed by NIC 44a of FIGS. 1 and 2.

The method begins at a provisioning step 200, with NIC 44A being provisioned with one or more assignments of packets to sub-flows into user-programmable scheme 124 via user API(s) 136. For example, the assignments provisioned for a given flow may comprise static assignments, distribution assignments and rules for transitioning among the static and distribution assignments, as described above. Further at step 200, controller 120 selects from among the provisioned assignments, an initial assignment, e.g., a default assignment predefined for the given flow, and starts applying the initial assignment. In an embodiment, the controller stores an identifier of the assignment currently used for the given flow in flow context 128.

At a reception from host step 204, Tx pipeline 116 of NIC 44A receives from host 32A a packet belonging to the given flow, for transmission to a peer node, e.g., destination node 24B. At a sub-flow selection step 208, the controller determines a sub-flow for the packet based on the assignment currently used the given flow, and possibly on notifications received from the network via Rx pipeline 108.

At a transmission step 212, packet modifier 132 sets the tuple of the packet to the tuple value associated with the sub-flow determined at step 208, and Tx pipeline 116 transmits the packet to the communication network via egress port 112.

At a monitoring step 216, controller 120 monitors notifications received from the communication network via the Rx pipeline, the notifications being indicative of states of one or more sub-flows of the given flow corresponding to the current assignment.

At a performance query step 220, the controller checks whether the performance level in transmitting the given flow to the peer node using the current assignment is acceptable, e.g., based on the states of the sub-flow(s) reported in the notifications. For example, the controller checks whether any predefined performance criterion is violated, as described above. When at step 220 the performance level is unacceptable (e.g., at least one performance criterion has been violated), the controller proceeds to an assignment transitioning step 224, at which the controller selects another assignment, different from the current assignment, and applies the other assignment to subsequent packets of the given flow.

Following step 220 when the performance level is acceptable, and following step 224, controller 120 loops back to step 204 to receive another packet of the given flow from the host.

Handling Packets Requiring Ordered Reception

In some embodiments, flow 26 contains multi-packet messages. When packets of a common message are assigned to the same sub-flow (e.g., in accordance with a static assignment), these packets arrive at destination node 24B in the same order in which they were transmitted by source node 24A. For example, even when communication network 28 comprises a lossless fabric (in which case no packets are dropped by the switches), some RDMA operations such as "RDMA send" are required to retain order among the packets. NIC 44a does not assign packets of such operations to sub-flows using a distribution assignment, to prevent the arrival of the packets at the destination in an order different from the order in which they were transmitted by the source node.

As noted above, in some embodiments, sender-side NIC 44A, refrains from applying distribution assignments to packets for which the remote node does not support out of order reception. Usage of distribution assignments may be enabled or disabled in the NIC, e.g., via user API 136, by marking packets as supporting or not supporting out of order reception, or both. For example, NIC 44a may disable usage of a distribution assignment for packets supporting out of order reception, e.g., when such distribution assignment results in poor performance.

Figure 5:
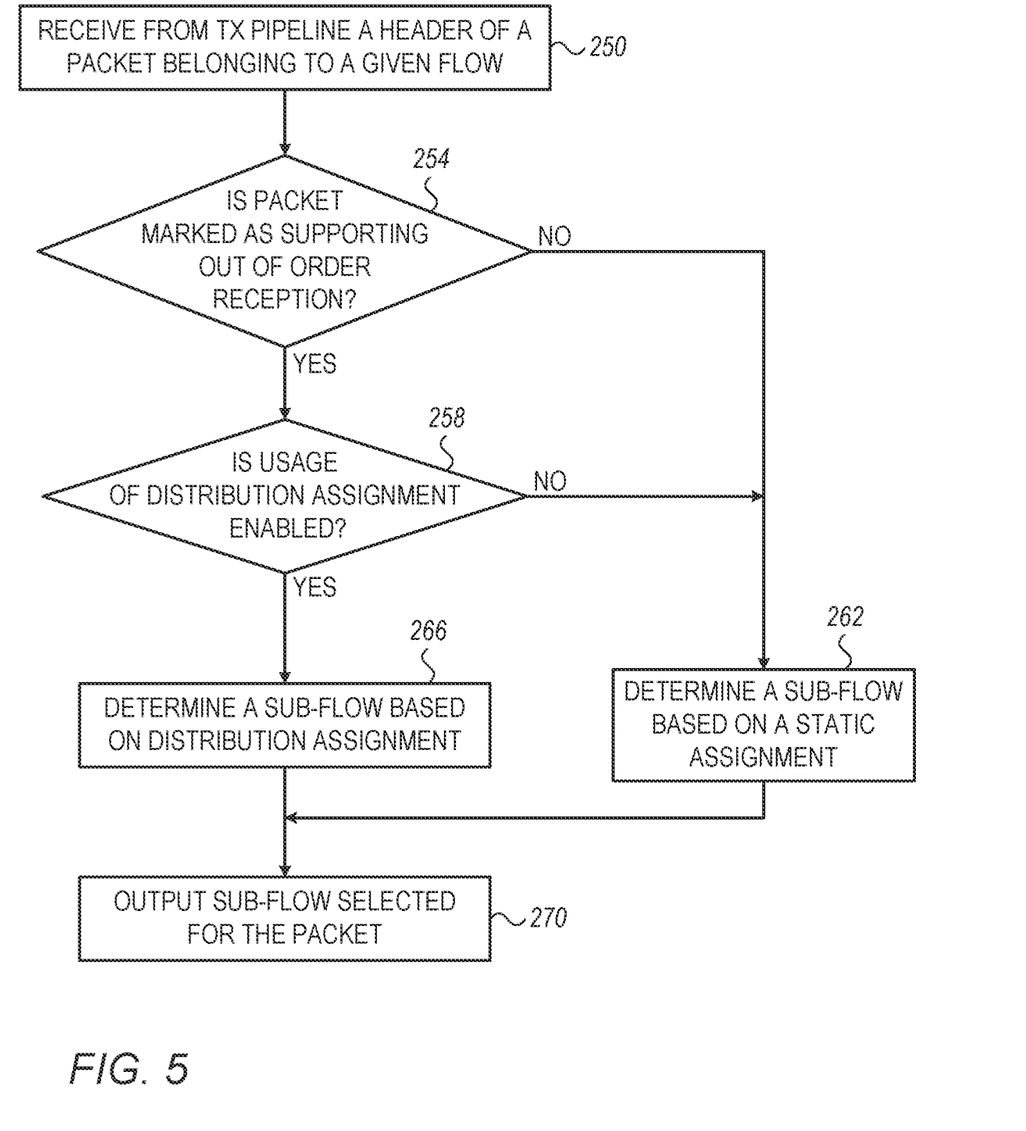
FIG. 5 is a flow chart that schematically illustrates a method for determining a sub-flow for a packet, in accordance with an embodiment that is described herein.

FIG. 5 is a flow chart that schematically illustrates a method for determining a sub-flow for a packet, in accordance with an embodiment that is described herein. The method may be used, for example, in implementing step 208 of the method of FIG. 4 above while taking into consideration whether packets are allowed to arrive at the destination out of order. It is further assumed that user-programmable scheme 124 holds one or more static assignments and a distribution assignment that can be enabled or disabled, as described above.

The method begins at an input step 250, with controller 120 receiving from Tx pipeline 116, a header of a packet (or part thereof) belonging to a given flow. At an out or order query step 254, the controller checks whether the received packet is marked as supporting out of order reception, and if so, the controller proceeds to a distribution query step 258, at which the controller checks whether the distribution assignment is enabled for the given flow or not.

When at step 254 the packet does not support out of order reception or when at step 258 the distribution assignment is disabled, ordered packet delivery is maintained, by the controller assigning to the packet a sub-flow based on a static assignment, at a static assignment application step 262. When at step 254 the packet supports out of order reception, and in addition, at step 258 the distribution assignment is enabled for the packet, the controller determines a sub-flow for the packet based on the distribution assignment, at a distribution assignment application step 266.

Following each of steps 262 and 266, controller 120 outputs the sub-flow determined for the packet, at an output step 270, and the method terminates.

Managing Per-Flow Multipath with Network Switches Supporting Adaptive Routing

In some embodiments, in addition to a hash-based routing scheme, network switches 40 support adaptive determination of the optimal path a packet should follow to its destination through the network. Such a routing scheme is also referred to as an Adaptive Routing (AR) scheme. For example, some network switch products by the Nvidia corporation support the Nvidia's AR scheme.

NIC 44A may mark the packets of s given flow with an indication signaling to the switches whether to locally select paths for the packets of the given flow based on the tuples of the packets (sub-flow hash-based forwarding) or using the adaptive routing scheme.

In some embodiments, NIC 44a enables or disables AR per flow. For example, The NIC holds for each flow a respective AR enable/disable state in flow context 128, and marks packets of the flow based on the AR state as will be described below.

In applying the AR scheme for a packet of a given flow, switch 40 selects for the packet the least loaded output port (from a set of outgoing ports leading to the destination of the given flow) based on egress port queue depth and path priority (e.g., the shortest path has the highest priority).

In some embodiments, only a partial subset of the entire switches of the communication network support or enable using the AR scheme. For example, the NIC marks the packets with the indication for selecting paths using the tuples up to a predefined hop, and for selecting paths using the adaptive routing scheme for one or more hops following the predefined hop.

Forwarding in the switches using the AR scheme typically performs well in various scenarios, but may result in poor performance in others, e.g., when the underlying topology is highly complex. For example, applying AR in the switches for a given flow may cause many out of order reception events, which in turn degrade performance in delivering packets of the given flow to the destination. It is therefore sometimes advantageous to disable AR to packets of flows suffering performance degradation due to the AR.

In some embodiments, since with AR packets sent over different paths may arrive at the destination in an order different from the order in which they were transmitted by the source node, AR is applied in switch 40 only for packets for which the destination allows out of order reception. When switch 40 applies AR the switch ignores tuple information that the NIC may have set in the packets in assigning the packets to sub-flows. For example, a packet may be assigned by the NIC to some sub-flow associated with a corresponding first path, but the switch applying AR may decide to forward this packet to a different second path having an available bandwidth larger than that of the first path.

Figure 6:
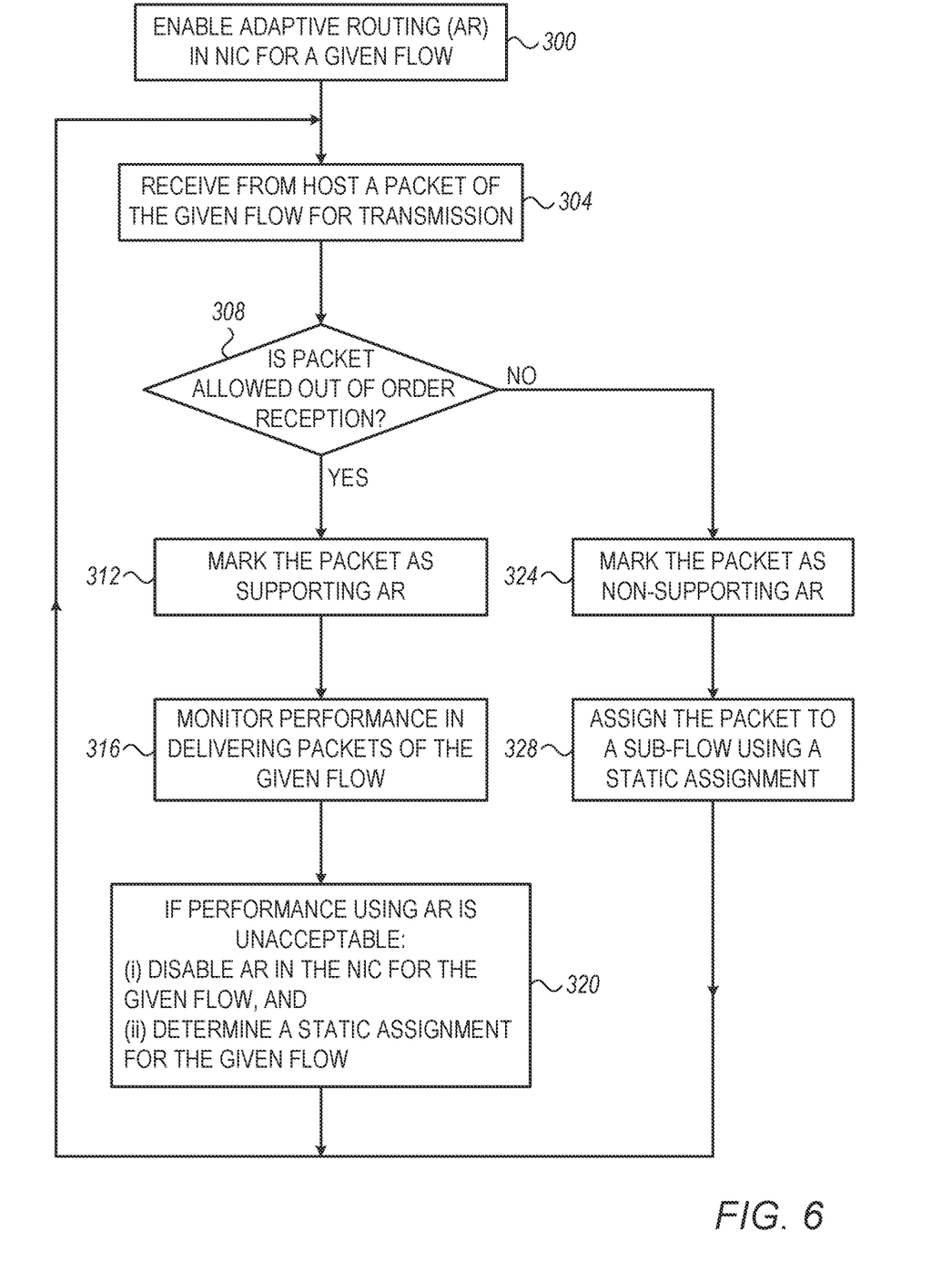
FIG. 6 is a flow chart that schematically illustrates a method for managing per-flow multipath with network switches supporting both Adaptive Routing (AR) and sub-flow hash-based routing, in accordance with an embodiment that is described herein.

FIG. 6 is a flow chart that schematically illustrates a method for managing per-flow multipath with network switches supporting both Adaptive Routing (AR) and sub-flow hash-based routing, in accordance with an embodiment that is described herein.

The method of FIG. 6 is applicable, for example, for sending packets in accordance with the Internet Protocol Security (IPsec) protocol, which is typically sensitive to out of order reception caused, e.g., by AR.

The method begins with NIC 44A enabling AR for a given flow, at an AR configuration step 300. Consequently, packets of the given flow for which the destination supports out of order reception, will be forwarded by switches 40 using the AR scheme and not using the sub-flow hash-based routing scheme.

At a reception step 304, NIC 44A receives from host 32A a packet of the given flow for transmission. At a query step 308, NIC 44A checks whether out of order reception is allowed for the packet, and if so, marks the packet as supporting AR, at an AR support marking step 312, and transmits the packet to communication network 28. In some embodiments, the packets have separate fields in the header for marking a packet as supporting or not supporting out of order reception and for marking the packet as supporting or not supporting AR. In other embodiments, a common field in the header serves for both types of markings.

At a performance evaluation step 316, the NIC evaluates the performance in delivering the given flow to its destination, e.g., based on notifications received from the communication network. For example, the received notifications are indicative of Round-Trip Time (RTT) measurements corresponding to multiple respective paths selected by the AR scheme.

At an AR disabling step 320, NIC 44A detects that the performance level for the given flow due to the AR scheme is unacceptable, e.g., by detecting that the variation among the RTT measurements corresponding to the different paths exceeds a threshold variation, the NIC disables AR for the given flow in the NIC, and determines for the given flow a static assignment.

When at step 308 above the destination does not allow out of order reception for the packet, the NIC marks the packet as non-supporting AR, at a non-AR marking step 324, and at a static assignment step 328, assigns the packet to a sub-flow in accordance with a static assignment.

Following each of steps 320 and 328 the method loops back to step 304 to receive another packet of the given flow from the host.

In the example method of FIG. 6, NIC 44A initially enables AR for a given flow, and upon detecting that the performance with AR is poor, disables AR for the given flow and switches to using a static assignment. In alternative embodiments, the NIC may occasionally enable AR for the given flow, and possibly fallback to a static assignment if performance with the re-enabled AR is still poor.

The computer system configuration of FIG. 1 and the NIC configuration of FIG. 2 are given by way of example, and in alternative embodiments, other suitable computer system and NIC configurations can also be used.

Some elements of NIC 44A, such as Rx pipeline 108, TX pipeline 116 and multipath controller 120 may be implemented in hardware, e.g., in one or more Application-Specific Integrated Circuits (ASICs) or Field-Programmable Gate Arrays (FPGAs). Additionally or alternatively, some elements of the NIC can be implemented using software, or using a combination of hardware and software elements.

Elements that are not necessary for understanding the principles of the present application, such as various interfaces, addressing circuits, timing and sequencing circuits and debugging circuits, have been omitted from FIG. 1 and FIG. 2 for clarity.

Memory 122 may comprise any suitable storage device using any suitable storage technology, such as, for example, a Random Access Memory (RAM) or a nonvolatile memory such as a Flash memory.

In some embodiments, some of the functions of multipath controller 120 may be carried out by a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

The various elements of NIC 44A such as Rx pipeline 108, Tx pipeline 116, and controller 120 are collectively referred to in the claims as "one or more circuits".

The embodiments described above are given by way of example, and other suitable embodiments can also be used.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network adapter, comprising:
a port, to communicate packets over a network in which switches forward the packets in accordance with tuples of the packets; and
one or more circuits, to:
receive packets of a given flow, for transmission to a peer node coupled to the network, the given flow comprising multiple sub-flows identified by respective different tuples;
initially assign the packets of the given flow to the sub-flows by setting the tuples of the packets in accordance with a defined assignment;
transmit the packets to the peer node via the port;
monitor one or more notifications received from the network, the notifications being indicative of respective states of the sub-flows;
modify the assignment of the packets to the sub-flows based on the received notifications;
assign subsequent packets of the given flow to the sub-flows, by setting the tuples of the subsequent packets in accordance with the modified assignment; and
transmit the subsequent packets to the peer node via the port.

2. The network adapter according to claim 1, wherein, by setting different tuples to different sub-flows, the one or more circuits in the network adapter are to cause the switches in the network to forward at least two of the sub-flows over different paths in the network.

3. The network adapter according to claim 2, wherein the one or more circuits are to assign tuples having different source port numbers to different respective sub-flows of the given flow.

4. The network adapter according to claim 1, wherein the one or more circuits are to provide an Application Programming Interface (API) for a user to specify the defined assignment.

5. The network adapter according to claim 1, wherein the one or more circuits are to initially assign the packets to a first sub-flow, in accordance with the assignment, and to assign the subsequent packets to a second sub-flow, different from the first sub-flow, in accordance with the modified assignment.

6. The network adapter according to claim 5, wherein the one or more circuits are to assign the subsequent packets to the second sub-flow in response to the notifications being indicative of congestion or link failure on a path in the network traversed by the first sub-flow.

7. The network adapter according to claim 1, wherein the one or more circuits are to determine the assignment of the subsequent packets in response to receiving from the network notifications indicative of underutilization in sending a first sub-flow to the peer node.

8. The network adapter according to claim 1, wherein the one or more circuits are to distribute other packets of the given flow among multiple sub-flows in accordance with a distribution assignment.

9. The network adapter according to claim 8, wherein the one or more circuits are to distribute the other packets among the multiple sub-flows, when the peer node supports receiving the other packets in an order different from a transmission order by the network adapter.

10. The network adapter according to claim 8, wherein the one or more circuits are to, in response to receiving one or more notifications indicative that a network performance criterion is violated while distributing the other packets, reassign the other packets to a selected sub-flow among the sub-flows of the given flow.

11. The network adapter according to claim 1, wherein the one or more circuits are to initially distribute the packets among the sub-flows in accordance with a first distribution scheme, and to distribute the subsequent packets among the sub-flows in accordance with a second distribution scheme, different from the first distribution scheme.

12. The network adapter according to claim 1, wherein the switches in the network support an adaptive routing scheme in which a switch adaptively selects a path to the peer node from among multiple paths, and wherein the one or more circuits are to mark the packets of the given flow with an indication signaling to the switches whether to locally select paths for the packets of the given flow based on the tuples of the packets or using the adaptive routing scheme.

13. The network adapter according to claim 12, wherein the one or more circuits are to mark the packets of the given flow with the indication for selecting paths using the adaptive routing scheme, and in response to receiving notifications indicative of a variation among Round-Trip Time (RTT) measurements corresponding to different paths exceeding a threshold variation, mark subsequent packets of the given flow with the indication for selecting paths based on the tuples.

14. The network adapter according to claim 12, wherein the one or more circuits are to mark the packets with the indication for selecting paths using the tuples up to a predefined hop, and for selecting paths using the adaptive routing scheme for one or more hops following the predefined hop.

15. A method for communication, comprising:
in a network adapter comprising a port, communicating via the port packets over a network in which switches forward the packets in accordance with tuples of the packets;
receiving packets of a given flow, for transmission to a peer node coupled to the network, the given flow comprising multiple sub-flows identified by respective different tuples;
initially assigning the packets of the given flow to the sub-flows by setting the tuples of the packets in accordance with a defined assignment;
transmitting the packets to the peer node via the port;
monitoring one or more notifications received from the network, the notifications being indicative of respective states of the sub-flows;
modifying the assignment of the packets to the sub-flows based on the received notifications;
assigning subsequent packets of the given flow to the sub-flows, by setting the tuples of the subsequent packets in accordance with the modified assignment; and
transmitting the subsequent packets to the peer node via the port.

16. The method according to claim 15, and comprising, by setting different tuples to different sub-flows causing the switches in the network to forward at least two of the sub-flows over different paths in the network.

17. The method according to claim 16, wherein assigning the packets to the sub-flows comprises assigning tuples having different source port numbers to different respective sub-flows of the given flow.

18. The method according to claim 15, and comprising providing an Application Programming Interface (API) for a user to specify the defined assignment.

19. The method according to claim 15, wherein assigning the packets comprises assigning the packets to a first sub-flow, in accordance with the assignment, and wherein assigning the subsequent packets comprises assigning the subsequent packets to a second sub-flow, different from the first sub-flow, in accordance with the modified assignment.

20. The method according to claim 19, wherein assigning the subsequent packets comprises assigning the subsequent packets to the second sub-flow in response to the notifications being indicative of congestion or link failure on a path in the network traversed by the first sub-flow.

21. The method according to claim 15, wherein determining the assignment of the subsequent packets comprises determining the assignment of the subsequent packets in response to receiving from the network notifications indicative of underutilization in sending a first sub-flow to the peer node.

22. The method according to claim 15, and comprising distributing other packets of the given flow among multiple sub-flows in accordance with a distribution assignment.

23. The method according to claim 22, wherein distributing the other packets comprises distributing the other packets among the multiple sub-flows, when the peer node supports receiving the other packets in an order different from a transmission order by the network adapter.

24. The method according to claim 22, and comprising, in response to receiving one or more notifications indicative that a network performance criterion is violated while distributing the other packets, reassigning the other packets to a selected sub-flow among the sub-flows of the given flow.

25. The method according to claim 15, wherein distributing the packets comprises distributing the packets among the sub-flows in accordance with a first distribution scheme, and wherein distributing the subsequent packets comprises distributing the subsequent packets among the sub-flows in accordance with a second distribution scheme, different from the first distribution scheme.

26. The method according to claim 15, wherein the switches in the network support an adaptive routing scheme in which a switch adaptively selects a path to the peer node from among multiple paths, and comprising, marking the packets of the given flow with an indication signaling to the switches whether to locally select paths for the packets of the given flow based on the tuples of the packets or using the adaptive routing scheme.

27. The method according to claim 26, and comprising marking the packets of the given flow with the indication for selecting paths using the adaptive routing scheme, and in response to receiving notifications indicative of a variation among Round-Trip Time (RTT) measurements corresponding to different paths exceeding a threshold variation, marking subsequent packets of the given flow with the indication for selecting paths based on the tuples.

28. The method according to claim 26, and comprising, marking the packets with the indication for selecting paths using the tuples up to a predefined hop, and for selecting paths using the adaptive routing scheme for one or more hops following the predefined hop.

* * * * *